United States Patent Office 3,444,271
Patented May 13, 1969

3,444,271
PROCESS OF SUSPENSION POLYMERIZATION
Vincent A. Aliberti, Springfield, Mass., assignor to Monsanto Company, St. Louis, Mo., a corporation of Delaware
No Drawing. Filed Jan. 3, 1966, Ser. No. 517,974
Int. Cl. C08f 1/11, 15/04
U.S. Cl. 260—878
14 Claims

ABSTRACT OF THE DISCLOSURE

An ABS type polymer blend is produced in suspension by incorporating a small amount of a water soluble inorganic nitrite. The suspending agent is a polymeric polycarboxylic acid or a polymeric alcohol or a combination thereof.

---

The present invention relates to an improved process for polymerizing vinylidene aromatic hydrocarbons by suspension polymerization and, more particularly, to a process providing an improved aqueous suspension of the components in such a polymerization process.

Vinylidene aromatic hydrocarbons are employed widely for the production of highly utilitarian polymers and interpolymers. Styrene and interpolymers thereof are the most widely employed vinylidene aromatic hydrocarbons because of low cost commensurate with desirable properties. It is also known that vinylidene aromatic hydrocarbon-rubber blends, i.e., wherein a portion of the vinylidene aromatic hydrocarbon or interpolymers thereof are grafted upon a preformed rubber substrate, have valuable physical properties and particularly significantly increased impact strength. Various types of processes have been proposed for use in polymerizing monovinylidene aromatic hydrocarbons and interpolymers thereof or for grafting the vinylidene aromatic hydrocarbon or interpolymers thereof upon the diene rubber substrate. Of these processes, suspension polymerization affords various advantages but is subject to difficulties in obtaining and maintaining optimum suspension of the components in the aqueous medium, particularly due to the emulsifiability of the monomers which reduces the yield and due to the scale formation on the walls of the reaction vessel. In addition, there are sometimes difficulties in avoiding agglomeration of the polymer and in obtaining reasonable latitude in process operation when efforts are made to reduce the amount of suspending agent or to reduce the ratio of water to syrup without increasing emulsion loss or wall scale formation.

It is an object of the present invention to provide an improved process for polymerizing vinylidene aromatic hydrocarbons wherein the monomer and any coreactants are suspended in an aqueous medium so as to obtain a relatively highly stable and relatively temperature-independent suspension which enables reduced emulsion losses and control of wall scale formation.

It is also an object to provide such an improved suspension polymerization process which is relatively economical and wherein wall scale formation in the reaction vessels may be reduced or readily controlled while minimizing emulsion losses and obtaining satisfactory bead size and distribution.

Other objects and advantages will be readily apparent from the following detailed description and claims.

It has now been found that the foregoing and related objects can be readily attained in a process for polymerizing vinylidene aromatic hydrocarbons by a step wherein a polymerizable formulation containing a vinylidene aromatic hydrocarbon monomer is suspended in an aqueous medium in the presence of 5.0 to 200.0 parts per million, based upon the aqueous medium, of a water-soluble inorganic nitrite and 0.01 to 1.0 percent by weight, based upon the aqueous medium, of a suspending agent selected from the group consisting of polymeric polycarboxylic acids, polymeric alcohols, and the combination thereof. The ratio of the monomer formulation to water is about 20 to 150:100.

Various inorganic nitrites may be employed in the present invention, including alkali metal salts, alkaline earth metal salts, ammonium salts, etc. Although the nitrite may be present in the amounts of up to 200 parts per million, the preferred compositions utilize less than about 100 parts per million, and most desirably about 15 to 65 parts per million. Of the various salts, sodium nitrite has been found highly advantageous because of its solubility and cost. The theory of operation of the nitrite is not understood, but its effectiveness in suppressing emulsion loss in these low amounts has been highly advantageous while enabling maintenance of the desirable suspending action and avoiding loss in desirable properties of the polymer.

The polymeric polycarboxylic acids comprise water-soluble homopolymers or interpolymers of unsaturated carboxylic acids having a carbon chain of three to eight carbon atoms. The polymeric acids have a degree of polymerization of at least twenty monomer units and provide a pH of less than 6.5 in aqueous solution. For purposes of the present invention, the homopolymers and interpolymers are considered to be water-soluble if 0.1 part of the polymeric material will dissolve in 99.9 parts of water at 25° centigrade. The term "polycarboxylic" as employed in "polymeric polycarboxylic acids" describes the presence of a plurality of carboxylic groups along the polymer chain and does not require that the monomeric acid be polycarboxylic.

Exemplary of the unsaturated carboxylic acids which may be employed as the carboxylic acid monomer are acrylic, crotonic, isocrotonic, angelic, tiglic, maleic, fumaric, itaconic, citraconic, mesaconic and aconitic acids or the anhydrides or other derivatives thereof which upon hydrolysis will produce free carboxylic acid groups. Mixtures of such acids may be interpolymerized, and various vinyl monomers also may be interpolymerized therewith so long as the resultant interpolymer is one which has the requisite water solubility and free carboxylic acid groups upon hydrolysis. Illustrative of such vinyl monomers are vinyl halides, allyl compounds, dienes, ethylene, propylene or styrene. As will be readily appreciated, the mol percent of the vinyl comonomers tolerable for water solubility will depend upon the carboxylic monomer and the number of carbon atoms contained in the vinyl comonomer and the nature thereof.

Exemplary of the polymeric polycarboxylic acids which have been employed as suspending agents are interpolymers of acrylic acids and alkyl acrylate esters, interpolymers of vinyl acetate and maleic acid anhydride, polymethacrylic acid, polyacrylic acid and the interpolymers of ethylene and maleic anhydride.

The preferred polymeric polycarboxylic acids are the acrylic acid-acrylate ester interpolymers disclosed in U.S. Patent No. 3,051,682, granted Aug. 28, 1962. This suspending agent comprises a water-soluble interpolymer of an acidic monomer of the group consisting of acrylic acid, methacrylic acid and mixtures thereof, and an ester monomer of the group consisting of an alkyl acrylate, alkyl methacrylate and mixtures thereof, in which the alkyl group contains six to eighteen carbon atoms. As indicated in the aforementioned patent, when acrylic acid is employed as the acidic monomer, the interpolymer will contain (a) 5 to 15 mol percent of the ester monomer when its alkyl group contains 6 to 7 atoms, (b) 1.5 to 8.0 mol percent of the ester monomer when its alkyl group contains 8 to 9 carbon atoms, (c) 1 to 7 mol percent of the ester monomer when its alkyl group contains 10 to 11 carbon atoms, (d) 1 to 6 mol percent of the ester monomer when its alkyl group contains 12 to 15 carbon atoms and (e) 0.5 to 2.5 mol percent of the ester monomer when its alkyl group contains 16 to 18 carbon atoms. When methacrylic acid is employed as the acidic monomer, the interpolymer will contain (a) 1 to 10 mol percent of the ester monomer when its alkyl group contains 6 to 7 carbon atoms, (b) 0.5 to 5.0 mol percent of the ester monomer when its alkyl group contains 8 to 9 carbon atoms, (c) 0.5 to 2.0 mol percent of the ester monomer when its alkyl group contains 10 to 11 carbon atoms, (d) 0.3 to 1.5 mol percent of the ester monomer when its alkyl group contains 12 to 15 carbon atoms and (e) 0.1 to 1.0 mol percent of the ester monomer when its alkyl group contains 16 to 18 carbon atoms.

The reason that the limits on the molar proportions of the two monomer types that may be included in the acrylic acid-acrylate interpolymer vary depending upon whether acrylic acid or methacrylic acid is included therein, is the fact that methacrylic acid is more hydrophobic than acrylic acid. Accordingly, if a mixture of acrylic acid and methacrylic acid is included in the interpolymer, the limits on the proportions of the two monomers types included in the interpolymer will be intermediate between those set forth above for interpolymers containing either acrylic acid or methacrylic acid as the sole acidic monomer. As a specific example, if a mixture of equal mol proportions of acrylic acid and methacrylic acid is included in the interpolymer with an octyl acrylate, the interpolymer should contain 1.0 to 6.5 mol percent of the octyl acrylate.

By letting $n$ represent the mol fraction of acrylic acid included in the acidic monomer component of the interpolymer, the lower limit of the ester monomer that can be employed may be restated as (a) $1+4n$ mol percent when the alkyl group of the ester monomer contains 6 to 7 carbon atoms, (b) $0.5+1n$ mol percent when the alkyl group of the ester monomer contains 8 to 9 carbon atoms, (c) 0.5 to $0.5n$ mol percent when the alkyl group of the ester monomer contains 10 to 11 carbon atoms, (d) 0.3 to $0.7n$ mol percent when the alkyl group of the ester monomer contains 12 to 15 carbon atoms, and (e) $0.1+0.4n$ mol percent when the alkyl group of the ester monomer contains 16 to 18 carbon atoms. The maximum quantity of the ester monomer that can be included in the interpolymer will be (f) $10+5n$ mol percent when the alkyl group of the ester monomer contains 6 to 7 carbon atoms, (g) $5+3n$ mol percent when the alkyl group of the ester monomer contains 8 to 9 carbon atoms, (h) $2+5n$ mol percent when the alkyl group of the ester monomer contains 10 to 11 carbon atoms, (i) $1.5+4.5n$ mol percent when the alkyl group of the ester monomer contains 12 to 15 carbon atoms, and (f) $1+1.5n$ mole percent when the alkyl group of the ester monomer contains 16 to 18 carbon atoms. In all the above formulas, $n$ is numerically equal to the mol percent of acrylic acid included in the interpolymer divided by the sum of the mol percent of acrylic acid plus the mol percent of methacrylic acid included in the interpolymer.

As indicated in U.S. Patent No. 2,945,013, granted on July 12, 1960, acrylic acid-acrylate interpolymers may be prepared by admixing a mixture of the two monomers with a free radical generating polymerization initiator and heating the mixture to a temperature at which the initiator decomposes to form free radicals. Such polymerizations can be carried out by heating the monomers en masse or preferably by first dissolving the monomers in a suitable solvent. In particular, it is preferred to prepare the interpolymers employing a solvent/non-solvent polymerization system, i.e., carrying out the polymerization in an organic liquid that is a solvent for the monomers but a non-solvent for the interpolymer. Typical of the liquids that may be employed as solvents for the polymerization reaction are aliphatic hydrocarbons such as hexane, pentane, octane, petroleum ethers boiling in the range of 50 to 125° centigrade; aromatic hydrocarbons such as benzene, toluene, xylene, ethylbenzene; chlorinated hydrocarbons such as chlorobenzene, 1,2-dichloroethane, chloroform, carbon tetrachloride; etc.

As disclosed therein, a specific and highly effective interpolymer which is also advantageously employed for the present invention is an interpolymer containing 95.0 to 98.0 mol percent of acrylic acid and 5.0 to 2.0 mol percent of an octyl acrylate and particularly 2-ethylhexyl acrylate.

The preferred suspending agents of this acrylic acid-acrylate ester interpolymer form have specific viscosities of at least 0.1 when methacrylic acid is the acidic monomer included in the interpolymer and at least about 0.8 when acrylic acid is the acidic monomer included in the interpolymer. Both of the above-noted specific viscosity values are determined in 1.0 percent solutions in water at 25° centigrade in accordance with the following formula:

Specific Viscosity =

$$\frac{\text{Solution Viscosity} - \text{Solvent Viscosity}}{\text{Solvent Viscosity}}$$

Generally, the pH of the polymeric polycarboxylic acids employed may vary within the range of 1.0 to 6.5, but the preferred 2.0 to 5.0. When employing an interpolymer of a polycarboxylic acid and an ester, such as the preferred suspending agent hereinbefore described, an increase in the mol percentage of ester groups tends to increase the viscosity of the solution produced thereby.

The polymeric alcohol corresponds to the following general formula:

$$H[CH_2-HCOX-R]_nH$$

wherein X is hydrogen, HCO—, $CH_3CO$—, or $$CH_3CH_2CO—$$

R is —$CH_2$—HCOX—, $CH_2HC_2$—, or $$-\overset{CH_3}{\underset{|}{C}}HCH_2-$$

$n$ is at least 10; and at least 5 mol percent but not more than about 35 mol percent of X is an ester group to provide optimum water-solubility.

As indicated, the polymeric alcohol is generally prepared by partially hydrolyzing a polymer of a vinyl ester of formic, acetic and propionic acids. It will be appreciated that the polymer may be an interpolymer of these several esters and, as indicated by the formula, it may also be interpolymerized with ethylene, propylene or mixtures thereof. It has been found that at least 5.0 mol percent of the ester group must be provided for operation in accordance with the present invention, but the amount of ester which is hydrolyzed to the alcohol should be sufficient to provide water-solubility. Generally, at least 65 percent of the ester groups must be hydrolyzed to the alcohol and preferably the mol percentage of ester groups is 10 to 25.

Generally, the solubility of the polymeric alcohol increases as the mol percentage of ester groups decreases. However, it has been found that decreasing the mol percentage of ester groups tends to increase the amount of polymeric alcohol required to achieve optimum efficacy in comparable process conditions.

The molecular weight of the polymeric alcohol may vary over a wide range consistent with the desired water-solubility. For purposes of the present invention, the polymeric alcohol is considered water-soluble if 0.1 part thereof will dissolve in 99.9 parts of water at 25° centigrade. Generally, the polymeric alcohol will contain at least 10 monomer units and may contain as much as and even more than 5000 monomer units, depending upon the monomers employed. The preferred polymeric alcohols contain 500 to 1500 monomer units.

Exemplary of the polymeric alcohols of the present invention are partially hydrolyzed polyvinyl acetate; partially hydrolyzed polyvinyl propionate; partially hydrolyzed polyvinyl formate; partially hydrolyzed ethylene-polyvinyl acetate interpolymers, partially hydrolyzed interpolymers of propylene and vinyl acetate, etc. Specific polymeric alcohols which have proven highly satisfactory in the process of the present invention are partially hydrolyzed polyvinyl acetates having a viscosity of 15 to 50 centipoises for a 4.0 percent solution at 20° centigrate and containing 10 to 25 mol percent of vinyl acetate, when used in combination with a polymeric polycarboxylic acid, and 14 to 25 mol percent when used alone. Generally, such alcohols are relatively neutral in pH (about 6.0 to 8.0).

In the copending application of Vincent A. Aliberti and Speros P. Nemphos, Ser. No. 517,097, filed Dec. 28, 1965 there is disclosed a novel synergistic suspending agent system provided by the polymeric alcohol and polymeric polycarboxylic acid in combination. When used in combination as disclosed therein, the polymeric polycarboxylic acid and polymeric alcohol may be used in a relatively wide range of concentration varying from as little as 0.005 to 1.0 percent by weight of each based upon the weight of the aqueous medium. It has also been found that the two components may vary relatively widely with respect to each other within the ratio 1 to 100:10; i.e., one component may be present in an amount as much as ten times greater than the other component. Preferably, the two components are provided in an amount of 0.01 to 0.5 percent by weight of each and in a ratio of about 2 to 50:10. As will be appreciated, the optimum concentrations and ratios will be dependent upon the particular polymerizable composition. For example, in polymerizing polystyrene in the presence of a preformed rubber such as butadiene, the polymeric alcohol and the polymeric polycarboxylic acid are most desirably employed in the range of 0.01 to 0.2 part by weight of each. In polymerizing a mixture of styrene/acrylonitrile monomers in the presence of a preformed butadiene rubber, the two components are desirably provided in a somewhat higher range of 0.02 to 0.5 percent by weight of each.

In the copending application of Vincent A. Aliberti, Ser. No. 517,979, filed Jan. 3, 1966, now abandoned, there is disclosed a process utilizing a partially esterified polyvinyl alcohol as the suspending agent. As disclosed therein, the polyvinyl alcohol contains 14 to 35 mol percent of ester groups and has a viscosity of 5 to 50 centipoises in a 4.0 percent aqueous solution at 20° centigrade. Preferably, the polyvinyl alcohol contains 15 to 25 mol percent of the ester groups and has a viscosity of 15 to 50 centipoises.

Such a polymeric alcohol is preferred when not used in combination with a polymeric polycarboxylic acid. When used alone, the polymeric alcohol is in the amount of 0.02 to 1.0 percent by weight, based upon the aqueous medium, and preferably 0.05 to 0.5 percent.

When the polymeric polycarboxylic acid is employed alone, it is employed in the amount of about 0.02 to 1.0 percent by weight of the aqueous medium, and preferably about 0.05 to 0.5 percent.

The preferred suspending agents for the present invention are the synergistic combinations of a polymeric polycarboxylic acid and a polymeric alcohol. By the use of such a suspending agent, only relatively small amounts of the two components are required to obtain a relatively temperature-independent suspension which evidences a relatively low emulsion loss in accordance with the present invention by the addition thereto of small amounts of a water-soluble inorganic nitrite.

To obtain suspensions, various electrolytes may be employed and may be provided within the range of 0.05–10.0 percent by weight, and preferably in the range of 0.1–5.0 percent by weight, based upon the weight of the aqueous medium. Such electrolytes comprise soluble salts of monovalent, divalent and trivalent metals, including chlorides, sulfates, phosphates and nitrates of metals such as magnesium, calcium, aluminum, and sodium.

In addition, secondary dispersing aids may be included if so desired, such as the condensation products of naphthalene sulfonic acids and aldehydes and the salts thereof such as those proprietary products sold by R. T. Vanderbilt Company under the trademark Darvan; by W. R. Grace under the trademark Daxad; and by Nopco Chemical Company under the trademark Lomar. These secondary dispersing agents may be employed in the range of 0.005–2.0 percent by weight, and preferably are present in an amount less than 0.5 percent by weight.

As will be appreciated, other dispersion aids may be incorporated such as sequestering agents, water-conditioning agents, emulsion depressants and stabilizers.

The process of the present invention is employed in the homopolymerization of vinylidene aromatic monomers or the interpolymerization of such vinylidene aromatic monomers with themselves or other interpolymerizable monomers or preformed or partially polymerized polymers. Examples of the vinylidene aromatic monomers that can be homopolymerized or interpolymerized include styrene, alpha-alkyl monovinylidene monoaromatic compounds, e.g., alpha-methylstyrene, alpha-ethylstyrene, alpha-methylvinyl toluene, alpha-methyl dialkylstyrenes, etc.; ring substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring alkyl-ring-halo-substituted styrenes, e.g., 2-chloro-4-methyl-styrene, 2,6-dichloro-4-methylstyrene, etc.; vinyl naphthalene; vinyl anthracene; divinyl benzene; etc.

Examples of monomers that can be interpolymerized with the vinylidene aromatic monomers include conjugated 1,3-dienes, e.g., butadiene, isoprene, etc., alpha, beta-unsaturated monobasic acids and derivatives thereof, e.g. acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, vinyl halides such as vinyl chloride, vinyl bromide, etc.; vinylidene halides such as vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc.

The polymerizable formulation may contain a preformed polymer or a partially polymerized material such as a partially polymerized vinylidene aromatic hydrocarbon or interpolymer. In this connection, the present process is particularly adapted to the formation of rubber blends wherein a portion of the vinylidene aromatic hydrocarbon is grafted upon a preformed rubber substrate to produce a high-impact polymer.

As is well known, such blends may have varying amounts of the vinylidene aromatic hydrocarbon or interpolymers thereof chemically combined with the rubber substrate depending upon factors such as the proportion of the interpolymer prepared in the presence of the rubber, the polymerization conditions, etc. Among the rubbers which may be employed are diene rubbers, ethylene-propylene rubbers, acrylate rubbers, and polyisoprene rubbers, and mixtures thereof.

The preferred rubbers are diene rubbers or mixtures of diene rubbers, i.e., any rubbery polymer (a polymer having a second order transition temperature not higher than 0° centigrade, preferably not higher than —20° centigrade, as determined by ASTM Test D–746–52T) of one or more conjugated 1,3-dienes, e.g., butadiene, isoprene, piperylene, chloroprene, etc. Such rubbers include homoplymers of conjugated 1,3-dienes, interpolymers of conjugated 1,3-dienes with one another, and interpolymers of one or more conjugated 1,3-dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.), arhalo monovinylidene aromatic hydrocarbons (e.g., the o-, m-, and p-chlorostyrenes, 2,4-dibromostyrene, 2-methyl-4-chlorostyrene, etc.), acrylonitrile, methacrylonitrile, alkyl acrylates (e.g., methyl acrylate, butyl acrylate, 2-ethylhexyl acrylate, etc.), the corresponding alkyl methacrylates, acrylamides (e.g., acrylamide, methacrylamide, N-butyl acrylamide, etc.), unsaturated ketones (e.g., vinyl methyl ketone, methyl isopropenyl ketone, etc.), alpha-olefins, (e.g. ethylene, propylene, etc.), vinyl pyridines, vinyl esters (e.g., vinyl acetate, vinyl stearate, etc.), vinyl and vinylidene halides (e.g., the vinyl and vinylidene chlorides and bromides, etc.) and the like.

A preferred group of diene rubbers are those which consist essentially of 85.0 to 100.0 percent by weight of butadiene and/or isoprene and up to 15.0 percent by weight of a monovinylidene aromatic compound.

Although the polymerization reaction may proceed thermally without added cataylsts, it is preferable to incorporate a suitable cataylst system for polymerizing the monomer such as the conventional monomer-soluble peroxy compounds. Exemplary catalysts are di-tert-butyl peroxide, benzoyl peroxide, lauroyl peroxide, oleyl peroxide, toluyl peroxide, di-tert butyl diperphthalate, tert-butyl peracetate, tert-butyl perbenzoate, dicumyl peroxide, tert-butyl peroxide isopropyl carbonate, 2,5 - dimethyl-2,5 - di(tert - butylperoxy)hexane, 2,5 - dimethyl - 2,5-di(tert-butylperoxy)hexyne - 3, tert-butyl hydroperoxide, cumene hydroperoxide, p-menthane hydroperoxide, cyclopentane hydroperoxide, diisopropylbenzene hydroperoxide, p-tert-butylcumene hydroperoxide, pinane hydroperoxide, 2,5-dimethylhexane-2,5-dihydroperoxide, etc., and mixtures thereof.

The catalyst is generally included within the range of 0.001–1.0 percent by weight, and preferably on the order of 0.005–0.5 percent by weight of the polymerizable material, depending upon the monomers and the desired polymerization cycle.

As is well known, it is often desirable to incorporate molecular weight regulators such as mercaptans, halides and terpenes in relatively small percentages by weight, on the order of 0.001–0.5 percent by weight of the polymerizable material. In addition, it may be desirable to include in relatively small amounts antioxidants or stabilizers such as the conventional alkylated phenols, although these may be added during or after polymerization.

The polymerizable formulation may also contain other additives such as plasticizers, lubricants and colorants. As indicated previously, it may also contain preformed polymeric materials which are soluble or dispersible in the monomers.

The polymerization may be carried out by charging the polymerizable formulation with a catalyst to a suitable reactor, and thereafter polymerizing the formulation en masse by stirring and heating at a temperature of 75–125° centigrade and over a period of about one to forty-eight hours, at a pressure of 1–100 pounds per square inch until a portion of the monomer has been polymerized, generally about 15.0–50.0 percent by weight thereof. The time for this partial polymerization will vary dependent upon the catalyst, pressures and temperatures employed and the particular monomers. Generally, it is preferred to conduct such a prepolymerization process to convert approximately 20.0–35.0 percent by weight of the monomer.

The syrup provided by the partially polymerized formulation then is admixed with water and the suspending agent to obtain the desired suspension of the syrup in the aqueous medium. This suspension is subjected to agitation at a temperature of about 75–200° centigrade for a period of one to forty-eight hours to obtain substantially complete polymerization of the monomers therein. Preferably, such further polymerization is carried out at a temperature of about 100–170° centigrade for a period of one to twenty hours depending upon the catalyst and the amount thereof employed.

In another embodiment of the present invention, the water and the suspending agent may be admixed with the polymerizable formulation initially, and the entire polymerization reaction caused to proceed in the presence thereof. Alternatively, the suspending agent may be incorporated in the polymerizable formulation during non-aqueous polymerization thereof as hereinbefore provided and thereafter the partially polymerized syrup admixed with water to achieve the desired suspension. It will be apparent that additional monomers, catalysts and other components may be introduced into the polymerizable formulation at various stages during polymerization as so desired.

The preferred process of the present invention utilizes prepolymerization of the polymerizable formulation en masse to approximately 20–35 percent conversion. Thereafter, the partially polymerized syrup is suspended in water with the addition of the suspending agent at that time to minimize any tendency for emulsion formation. Generally, such syrups will have a viscosity of 40–20,000 poises at 25° centigrade at a shear rate of 1.0 second$^{-1}$.

The polymerizable formulations contain at least 10 percent by weight of the vinylidene aromatic monomer and preferably at least 30 percent by weight of such monomer. Mixtures of such vinylidene monomers with acrylonitrile or methacrylonitrile monomers are highly advantageously employed for making styrene/acrylonitrile-type interpolymers. Generally, such mixtures will contain 20–95 percent by weight, and preferably 60–85 percent by weight, of the vinylidene aromatic hydrocarbon and 80–5 percent, and preferably 40–15 percent, by weight of the acrylonitrile or methacrylonitrile or mixture thereof.

As previously indicated, the present invention is highly advantageously employed in preparing polymer blends containing a preformed rubber wherein a portion of the vinylidene aromatic hydrocarbon or other comonomers are grafted upon the preformed rubber substrate. In such compositions, the preformed rubber, which may be an interpolymer such as of butadiene and one or more of the monomers of the polymerizable formulation, may constitute 1–30 percent by weight of the polymerizable formulation and preferably 1–20 percent by weight thereof.

Illustrative of the efficacy of the present invention are the following specific examples, wherein all amounts are parts by weight unless otherwise indicated:

EXAMPLE 1

To a reaction vessel are charged 87 parts styrene monomer, 13 parts of a butadiene rubber having a Mooney viscosity of 55 centipoises, and 5 parts of mineral oil. In additional, di-tert-butyl peroxide and tert-dodecyl mercaptan, and tris(nonylphenyl) phosphite are added as catalyst, molecular weight regulator and stabilizer. After the reaction vesel is purged of oxygen by a stream of nitrogen, the reaction mixture is stirred and heated to polymerize approximately 27 percent of the styrene. The resulting syrup has a viscosity in excess of 1000 poises at 25° centigrade at a shear rate of 1.0 second$^{-1}$.

Part A

This partially polymerized syrup is then admixed with 150 parts of water having dissolved therein 0.10 part of calcium chloride (2H$_2$O), 0.625 part of a sodium salt of a condensate of naphthalene sulfonic acid sold under the trademark Darvan by R. T. Vanderbilt Company and 0.2 part of polyvinyl alcohol having 42 percent by weight residual acetate groups and a viscosity of 9 centipoises in a 4 percent aqueous solution at 25° centigrade. The suspension is agitated and heated to polymerize the remaining monomer, cooled, centifuged, washed and dried to recover the product in the form of small spherical beads.

The beads recovered from the above process are found to be of uniform size. The emulsion loss is 2.12 percent, and the wall scale formation is of a low order.

Part B

The process of Part A is substantially repeated adding 40 parts per million, based on water, of sodium nitrite. The beads recovered from the procedure are of relatively uniform size. The emulsion loss is only 0.33 percent, and the wall scale formation is of a low order. Thus, it can be seen that a very small amount of the soluble inorganic nitrite greatly reduces the emulsion loss.

EXAMPLE 2

Part A

A prepolymerized syrup is prepared by a process similar to that of Example 1 and is admixed with 105.0 parts of water having dissolved therein 0.04 part of a partially hydrolyzed polyvinyl acetate containing 30.0 percent by weight of vinyl acetate and having a viscosity of 25 centipoises, 0.05 part of the interpolymer of acrylic acid and 2-ethylhexyl acrylate (containing 4.5 mol percent of 2-ethylhexyl acrylate and having a specific viscosity of 4.0), 0.14 part of a sodium salt of naphthalene sulfonic acid condensate (Darvan) and 0.93 part by weight of sodium sulfate. After agitation to obtain suspension of the syrup in the aqueous medium, the suspension is heated and agitated to polymerize the monomers, cooled, centrifuged, washed and dried to recover the product in the form of beads.

The bead products recovered from the process are of relatively uniform size. The emulsion loss is 3.01 percent, and the wall scale formation is tolerable for production purposes.

Part B

The process of Part A is substantially repeated adding 25 parts per million, based on water, of sodium nitrite. The beads are of substantially uniform size. The emulsion loss is reduced to 2.3 percent and the wall scale formation is tolerable for production purposes.

EXAMPLE 3

Part A

A prepolymerized syrup substantially as indicated in Example 1 is suspended in 100 parts water using as a suspending agent 0.17 part of an interpolymer of acrylic acid and 2-ethylhexyl acrylate containing 4.5 mol percent of 2-ethylhexyl acrylate and having a specific viscosity of 4.0. In addition, the formulation contains 0.12 part calcium chloride ($2H_2O$) and 0.39 part of the sodium salt of the naphthalene sulfonic acid condensate (Darvan).

After polymerization and recovery of the beads, the beads are found to be of relatively uniform size. The emulsion loss is determined to be 3.45 percent by weight. The wall scale formation is tolerable for commercial purposes.

Part B

The process of Part A is substantially repeated adding 30 parts per million, based on water, of sodium nitrite. Upon recovery, the beads are of substantially uniform size. The emulsion loss is reduced to 1.11 percent and the wall scale is tolerable for commercial purposes.

EXAMPLE 4

Ten parts of a butadiene rubber having a Mooney viscosity of 55 centipoises, 63 parts of styrene monomer and 27 parts of acrylonitrile monomer are heated and agitated in a reaction vessel to polymerize approximately 30 percent of the monomers. The syrup has a viscosity of 5000 poises at 25° centigrade.

One hundred parts of syrup are admixed with 100 parts water, 25 parts per million of sodium nitrite, 0.2 part of a partially hydrolyzed polyvinyl acetate containing 30.0 percent by weight vinyl acetate, 1.2 part sodium sulfate and 0.12 part of the sodium salt of a naphthalene sulfonic acid condensate (Darvan).

Upon completion of polymerization and recovery of the beads, it is found that the emulsion loss is only 1.0 percent by weight and that the wall scale formation is of relatively low order. The beads are found to have an average size of 0.03 inch.

EXAMPLE 5

The process of Example 4 is substantially repeated using in the suspension 0.05 part of the interpolymer of acrylic acid and 2-ethylhexyl acrylate (4.5 mol percent), 0.7 part of partially hydrolyzed polyvinyl acetate containing 30 percent vinyl acetate, 0.12 part of the sodium salt of naphthalene sulfonic acid condensate (Darvan), 1.2 part sodium sulfate and 25 parts per million sodium nitrite.

After recovery of the beads, they are found to be of substantially uniform size and the wall scale is of a relatively low order. The emulsion loss is only 2.0 percent.

Thus, it can be seen from the foregoing specific examples that the present invention greatly reduces emulsion losses to benefit the economy and operation of the present process. It enables use of suspending agents which would have borderline feasibility if used alone because of their tendency to promote emulsion loss. In its preferred aspect with the synergistic combination of a polymeric polycarboxylic acid and a polymeric alcohol, it is possible to obtain greater control of bead size, low losses of the monomers in the formation of emulsion and relatively low losses in the formation of wall scale thus enabling more efficient utilization of the reactors without the requirement for frequent cleaning operations. The suspending process of the present invention may be utilized with various types of syrups which are relatively insoluble in water and may also be employed with a variety of suspension polymerization processes; i.e., where the polymerizable formulation is initially partially polymerized before addition to water or where the polymerizable formulation is initially dispersed in water and all polymerization carried out in the presence thereof.

It is obvious that many variations can be made in the products and processes set forth above without departing from the spirit and scope of this invention.

What is claimed is:

1. In a process for producing ABS type polymer blends, the steps comprising forming a suspension by admixing components consisting essentially of an aqueous medium, a polymerizable formulation containing a vinylidene aromatic hydrocarbon monomer, an unsaturated nitrile monomer selected from the group consisting of acrylonitrile, methacrylonitrile and mixtures thereof, and a preformed rubber upon which said aromatic hydrocarbon and nitrile may be grafted, said vinylidene aromatic hydrocarbon comprising 20 to 95 percent by weight of the monomers in said formulation and said rubber comprising 1 to 30 percent by weight of the total weight of said polymerizable formulation, 5.0 to 200.0 parts per million based upon the aqueous medium, of a water soluble inorganic nitrite, and about 0.01 to 1.0 percent by weight, based upon the aqueous medium, of a suspending agent selected from the group consisting of polymeric polycarboxylic acids, polymeric alcohols, and the combination thereof, the ratio of monomer formulation to water being 20 to 150:100, said polymeric polycarboxylic acid comprising a water-soluble homopolymer or interpolymer of unsaturated carboxylic acids having a carbon chain of three to eight carbon atoms and having a degree of polymerization of at least twenty monomer units and providing a pH of less than 6.5 in aqueous solution, said polymeric alcohol corresponding to the following formula:

$$H[CH_2—HCOX—R]_nH$$

wherein X is hydrogen, HCO—, CH₃CO—, or

CH₃CH₂CO—,

R is —CH₂HCOX—, —CH₂CH₂—, $$-\overset{CH_3}{\underset{|}{C}}HCH_2-$$

$n$ is at least 10, and at least 5 mol percent but not more than about 35 mol percent of X is an ester group of optimum water-solubility; and thereafter polymerizing said polymerizable formulation.

2. The process of claim 1 wherein said polymerizable formulation is a syrup wherein a portion of the vinylidene aromatic hydrocarbon monomer and nitrile monomer has been prepolymerized and wherein said syrup has a viscosity of 40 to 20,000 poises at 25° centigrade at a shear rate of 1.0 second⁻¹.

3. The process of claim 1 wherein said vinylidene aromatic hydrocarbon monomer is styrene.

4. The process of claim 1 wherein said suspending agent is a partially hydrolized polyvinyl ester containing 14 to 30 mol percent of ester groups and having a viscosity of 5 to 50 centipoises in a 4.0 percent aqueous solution at 20° centigrade.

5. The process of claim 1 wherein said suspending agent is an interpolymer of an acid selected from the group consisting of acrylic, methacrylic and mixtures thereof, and an alkyl ester of an acid selected from the group consisting of acrylic, methacrylic and mixtures thereof, the alkyl group containing six to eighteen carbon atoms.

6. The process of claim 1 wherein said suspending agent is the combination of a polymeric alcohol and a polymeric polycarboxylic acid.

7. The method in accordance with claim 1 wherein said suspending agent comprises 0.01 to 0.5 percent by weight of a partially hydrolized polyvinyl ester and 0.01 to 0.5 percent by weight of an interpolymer of an acid selected from the group consisting of acrylic, methacrylic and mixtures thereof, and of an alkyl ester of an acid selected from the group consisting of acrylic, methacrylic and mixtures thereof, the alkyl group containing six to eighteen carbon atoms, said polyvinyl ester and interpolymer being present in a ratio of 2 to 50:10.

8. The method of claim 1 wherein said aqueous formulation contains 0.05 to 10.0 percent by weight of a soluble inorganic salt as an electrolyte.

9. In a process for producing ABS type blends, the steps comprising heating and agitating a polymerizable formulation comprising a mixture of vinylidene aromatic hydrocarbon monomer, an unsaturated nitrile monomer selected from the group consisting of acrylonitrile, methacrylonitrile and mixtures thereof, and a preformed rubber upon which said aromatic hydrocarbon and nitrile may be grafted, said vinylidene aromatic hydrocarbon comprising 20 to 95 percent by weight of the monomers in said formulation and said rubber comprising 1 to 30 percent by weight of the total weight of said polymerizable formulation to polymerize 15 to 50 percent by weight of the monomers therein and obtain a syrup having a viscosity of 40 to 20,000 poises at 25° centigrade at a shear rate of 1.0 second⁻¹; suspending said syrup in an aqueous medium to which are added components consisting essentially of 5.0 to 200.0 parts per million based upon the weight of the aqueous medium, of a water-soluble inorganic nitrite, and about 0.01 to 1.0 percent by weight, based upon the aqueous medium, of a suspending agent selected from the group consisting of polymeric polycarboxylic acids, polymeric alcohols, and the combination thereof, the ratio of monomer formulation to water being 20 to 150:100, said polymeric polycarboxylic acid comprising a water-soluble homopolymer or interpolymer of unsaturated carboxylic acids having a carbon chain of three to eight carbon atoms and having a degree of polymerization of at least twenty monomer units and providing a pH of less than 6.5 in aqueous solution, said polymeric alcohol corresponding to the following formula:

$$H[CH_2—HCOX—R]_nH$$

wherein X is hydrogen, HCO—, CH₃CO—, or

CH₃CH₂CO—

R is —CH₂HCOX—, —CH₂CH₂—, $$-\overset{CH_3}{\underset{|}{C}}HCH_2-$$

$n$ is at least 10, and at least 5 mol percent but not for optimum water-solubility; and thereafter polymerizing said polymerizable formulation.

10. The process of claim 9 wherein said vinylidene aromatic hydrocarbon monomer is styrene.

11. The process of claim 9 wherein said polymeric alcohol comprises a partially hydrolyzed polyvinyl ester.

12. The method in accordance with claim 9 wherein said suspending agent comprises 0.01 to 0.5 percent by weight of a partially hyddrolyzed polyvinyl ester and 0.01 to 0.5 percent by weight of an interpolymer of an acid selected from the group consisting of acrylic, methacrylic and mixtures thereof, and of an alkyl ester of an acid selected from the group consisting of acrylic, methacrylic and mixtures thereof, the alkyl group containing six to eighteen carbon atoms, said polyvinyl ester and interpolymer being present in a ratio of 2 to 50:10.

13. In a process for polymerizing vinylidene aromatic hydrocarbons, the steps comprising heating and agitating a polymerizable formulation containing styrene, an unsaturated nitrile monomer selected from the group consisting of acrylonitrile, methacrylonitrile and mixtures thereof, said styrene comprising 20 to 95 percent by weight of the monomers in said formulation and 1 to 30 percent by weight of a preformed rubber upon which said aromatic hydrocarbon may be grafted, to polymerize 20 to 35 percent by weight of the moonmers in said polymerizable formulation and obtain a syrup having a viscosity of 40 to 20,000 poises at 25° centigrade at a shear rate of 1.0 second⁻¹; suspending said syrup in an aqueous medium to which has been added 0.05 to 10 percent by weight based upon the aqueous medium, of a soluble inorganic salt as an electrolyte, 5.0 to 200.0 parts per million based upon the weight of the aqueous medium, of a water-soluble inorganic nitrite, and about 0.01 to 1.0 percent by weight, based upon the aqueous medium, of a suspending agent selected from the group consisting of polymeric polycarboxylic acids, polymeric alcohols, and the combination thereof, the ratio of monomer formulation to water being 20 to 150:100, said polymeric polycarboxylic acid comprising a water-soluble homopolymer or interpolymer of unsaturated carboxylic acids having a carbon chain of three to eight carbon atoms and having a degree of polymerization of at least twenty monomer units and providing a pH of less than 6.5 in aqueous solution, said polymeric alcohol corresponding to the following formula:

$$H[CH_2—HCOX—R]_nH$$

wherein X is hydrogen, HCO—, CH₃CO—, or CH₃CH₂CO—, R is

—CH₂HCOX—,—CH₂CH₂—, $$-\overset{CH_3}{\underset{|}{C}}HCH_2-$$

$n$ is at least 10, and at least 5 mol percent but not more than about 35 mole percent of X is an ester group for optimum water-solubility; and thereafter polymerizing said polymerizable formulation.

14. The method in accordance with claim 13 wherein said suspending agent comprises 0.01 to 0.5 percent by weight of a partially hydrolyzed polyvinyl ester and 0.01 to 0.5 percent by weight of an interpolymer of an acid selected from the group consisting of acrylic, methacrylic and mixtures thereof, and of an alkyl ester of an acid selected from the group consisting of acrylic, methacrylic and mixtures thereof, the alkyl group containing six to eighteen carbon atoms, said polyvinyl ester and interpolymer being present in a ratio of 2 to 50:10.

References Cited

UNITED STATES PATENTS

| 2,886,553 | 5/1959 | Stein et al. | 260—880 |
| 3,047,534 | 7/1962 | Dyer et al. | 260—880 |
| 3,051,682 | 8/1962 | Ott | 260—880 |
| 3,143,522 | 8/1964 | Conrad et al. | 260—880 |
| 3,265,642 | 8/1966 | Hatano | 260—2.5 |
| 3,265,643 | 8/1966 | Hatano et al. | 260—2.5 |

GEORGE F. LESMES, *Primary Examiner.*

M. J. TULLY, *Assistant Examiner.*

U.S. Cl. X.R.

260—83.5, 83.7, 86.3, 86.7, 93.5, 880, 885

PO-1050
(5/69)

UNITED STATES PATENT OFFICE
CERTIFICATE OF CORRECTION

Patent No. 3,444,271      Dated May 13, 1969

Inventor(s) Vincent A. Aliberti

It is certified that error appears in the above-identified patent and that said Letters Patent are hereby corrected as shown below:

Column 12, Claim 9, line 19 after "not" insert -- more than about 35 mol per cent of X is an ester group --.

SIGNED AND SEALED
NOV 18 1969

(SEAL)
Attest:

Edward M. Fletcher, Jr.

WILLIAM E. SCHUYLER, JR.
Commissioner of Patents